United States Patent Office 2,761,847
Patented Sept. 4, 1956

2,761,847

METHOD OF PREPARING IRON CATALYSTS CONTAINING KIESELGUHR

Herbert Koelbel and Robert Langheim, Homberg (Lower Rhine), Germany, assignors to Rheinpreussen Aktiengesellschaft fur Bergbau und Chemie, Homberg (Lower Rhine), Germany, a German corporation No Drawing. Application October 2, 1951, Serial No. 249,399

10 Claims. (Cl. 252—457)

This invention relates to a method of preparing iron catalysts containing kieselguhr. It more particularly relates to a method of preparing highly active iron catalysts for carbon monoxide hydrogenation which contain kieselguhr and alkaline earth in addition to copper and alkali.

The precipitation of iron catalysts containing kieselguhr and alkaline earth was conventionally effected by adding the kieselguhr to the nitrate solution and thereupon precipitating the iron catalyst by the addition of sufficient alkali carbonate or hydroxide until a pH of 7 to 8 was obtained. After washing the contact agent was then dried at about 110° C.

The iron catalysts prepared in this manner have no greater life and activity under normal pressure than the catalysts which do not have a carrier. They will normally give a synthesis yield of about 60 to 70 grams per cubic meter NTP $CO+H_2$ of hydrocarbons having more than one carbon atom in the molecule. These catalysts usually have a life of about four to six weeks.

When operated under a pressure of 10 atmospheres, they do not show any better properties than do iron catalysts which do not have a carrier. On the contrary, they tend to form a larger amount of methane and only have a very short life, due to their very low strength.

One object of this invention is an iron catalyst containing kieselguhr and alkaline earth and having a very high activity and life. This, and still further objects, will become apparent from the following description:

It has now been found that iron catalysts which, in addition to copper and alkali, also contain kieselguhr and alkaline earth as carriers or activators may be prepared with a surprisingly high activity and long life if the nitrate solution which contains the iron salt and is conventionally precipitated with alkali is added intermittently in batches to an alkali metal carbonate or alkali hydroxide solution in which the kieselguhr is suspended. The intermittent or batch addition is effected by first of all adding only a small quantity of the nitrate solution and continuously increasing the amount with each subsequent batch addition. After each addition, when alkali carbonate solution is employed, the carbon dioxide generation is allowed to terminate before the next addition is effected. After all the nitrate solution has been added and the precipitation is completed the catalyst paste is brought to its boiling point within five to twenty minutes and preferably within eight to twelve minutes and is then boiled for an additional two to seven and preferably three to five minutes.

It has been found advantageous if an excess of 5 to 40% alkali and preferably 10 to 30% alkali is used. It has also been found advantageous if the nitrate solution contains an excess of 5 to 40% nitric acid and preferably 10 to 25%.

It is still further of advantage if the concentration of the nitrate solution is not less than 2% and preferably not less than 5%.

The life and activity of the catalyst prepared in accordance with the invention is still further increased if the precipitated catalyst is dried at a temperature of less than 80° and preferably less than 60° C.

The new catalyst prepared in accordance with the invention has a degree of activity and a life hithertofore unknown, when alkali carbonate solution is employed. This high activity and long life depends on the maintenance of the following conditions during the preparation:

1. The nitrate solution must be added intermittently to the alkali carbonate or alkali hydroxide solution in which the kieselguhr is suspended.

2. The quantity of the individual additions of nitrate solution must be increased each time, for instance in approximately the following percentual portions: 5, 10, 15, 20, 25, 30% of the entire nitrate solution.

3. One must wait before making the next addition until the generation of carbon dioxide has terminated, when alkali carbonate solution is employed.

4. After the precipitation has been completed, the contact paste must be brought to a boil within 5 to 20 minutes and preferably 8 to 12 minutes and boiled for a further two to seven minutes and preferably 3 to 5 minutes.

5. During the precipitation there must be used for best results an excess of alkali of 5 to 40% and preferably 10 to 30% referred to the quantity of alkali required in order to neutralize the nitrate solution.

6. The nitrate solution for best results must contain an excess of 5 to 40% nitric acid and preferably 10 to 25%.

7. The concentration of the nitrate solutions may not be less than 2% and preferably not less than 5%.

8. The contact must be dried at temperatures of less than 80° and preferably less than 60° C.

The measures in accordance with the invention may be used individually or combined with each other. Each individual measure by itself gives a considerable improvement of the properties of the iron catalyst. When used together, however, the measures cooperatively operate to form a catalyst of maximum activity.

In conventional practice the alkali carbonate or alkali hydroxide solution is permitted to flow relatively rapidly in a stream, possibly even intermittently, into the nitrate solution. This method of acid precipitation results in catalysts which are extremely irregular having dark color and a low degree of hardness, and which scarcely differ in their activity from other prior known conventionally used catalysts. When, however, the iron catalyst containing kieselguhr and alkaline earth is precipitated in an alkaline medium according to the invention, i. e., when the nitrate solution is introduced into the alkali solution intermittently, the certainty of obtaining uniform catalyst is greatly increased. However, this is only assured if the first addition is kept small and if the next additions are continually increased so that the precipitation is carried out with about five to seven additions. The essential factor in the intermittent or batchwise addition of the nitrate solution to the alkali solution is that the individual additions are carried out very rapidly and the carbon dioxide formation is allowed to terminate before the next addition is effected. If these conditions are precisely maintained there is always obtained catalysts which have a light color and a great degree of hardness. These properties are a prerequisite for good activity.

If the catalyst paste on the one hand is brought too rapidly to the boiling point, it will foam very greatly, and if, on the other hand, it is brought too slowly to the boiling point, it will practically not foam at all. In both cases there is obtained a catalyst of a dark color, the activity of which in no way differs from that of a catalyst which does not have a carrier. The same applies to the boiling proper. If the catalyst paste is boiled, for example, for only one minute, it will, to be sure, be light in color, but its activity nevertheless will be poor. If, on the other hand, it is boiled too long, it will have a dark appearance, and likewise a low activity. Only if the periods of time indicated in measure 4 are maintained, can there be expected a catalyst of good activity.

The iron catalyst precipitated with the measures set forth under 1 to 4 above gives a yield of 105 to 115 grams per cubic meter NTP $CO+H_2$ without previous molding, at temperatures of 225° to 235° C. when operating with synthesis gas rich in hydrogen under normal pressure, as compared to a previous yield of 60 to 70 grams per cubic meter NTP $CO+H_2$.

The quality with respect to activity and life of a catalyst prepared in accordance with the invention as set out in measures 1 to 4 will be still further improved if any of the measures set forth under 5 to 8 are also effected.

Nothing can be found in the literature with regard to the use of an excess of nitric acid. With regard to the use of an excess of alkali, it is only known to use as much alkali as will cause the precipitated solution to have a pH of 8. The measure in accordance with the invention can by no means be concluded from this, inasmuch as in accordance with this preferred embodiment of the invention the alkalinity is carried substantially beyond the point of equivalence. The drying of the iron catalyst was heretofore carried out almost exclusively at 110° C. and no reference can be found in the pertinent literature in which drying is carried out with particular advantage at a lower temperature.

With the additional preferred use of all the measures set forth under 5 to 8 there were obtained iron catalysts of previously unknown activity. When operating with synthesis gas rich in hydrogen they worked the carbon monoxide under normal pressure at 185° to 225° C. to 90%. The life is increased seven to eight months and the yield is increased, depending upon the operating conditions to 120 to 160 grams per cubic meter NTP $CO+H_2$.

The iron catalyst precipitated in accordance with the invention may not only be used with synthesis gas rich in hydrogen under normal pressure, but can also be used with water gas at 205° to 235° C. with the yield of 135 to 165 grams per cubic meter NTP $CO+H_2$. In this connection, depending upon the alkalizing, there are obtained 25 to 50% of hydrocarbons boiling above 320° C. In accordance with the invention it is also possible to successfully use the iron catalyst prepared by the new method in the existing Fischer-Tropsch plants for cobalt catalysts. The yield in percent by weight, without additional operating means, amounts to 90% of the yield of cobalt catalyst but is superior in quality to the latter by 20 to 60%.

When using the iron catalyst prepared in accordance with the invention under a pressure of 10 to 50 atmospheres, a reaction temperature of 190° to 220° C. may be used, which is 20° to 30° C. lower than temperatures previously used. The low boiling products excel by a high olefin content, while the high boiling products are strongly saturated.

The following example is given to illustrate the steps in accordance with the invention and not to limit the same, the invention being limited by the appended claims or their equivalents:

*Example*

100 parts of iron, 10 parts of copper and 15 parts of magnesium, in the form of a 6% nitrate solution at room temperature containing an excess of 12% nitric acid are added in 6 portions of 6, 12, 15, 19, 22 and 26% to a 14% soda solution, which contains 16% soda in addition to the equivalent amount and in which 50 parts by weight of kieselguhr are suspended. Between the individual additions, carbon dioxide generation is allowed to terminate. The catalyst paste is then brought to the boiling point within 9 minutes and then boiled for a further three minutes. The precipitate is made alkaline after filtration and washing by means of a 2% potassium carbonate solution and then dried at 50° C.

The catalyst prepared in this manner works up the carbon monoxide of a hydrogen-rich synthesis gas ($1CO:2H_2$) at 215° to 225° C. to 90% under normal pressure without prior reduction of the catalyst. The yield of hydrogenation products is in this connection 120 to 130 grams per cubic meter NTP $CO+H_2$. 25 to 30% of the synthesis products obtained boil at a temperature of above 320°.

If the catalyst is previously reduced by a synthesis gas which is rich in hydrogen and thereupon operated with recycling at a volumetric velocity of 50 and at temperatures of 190° to 205° C. with a synthesis gas of the composition of $1CO:2H_2$, the carbon monoxide is worked to more than 90%. The yield per cubic meter NTP $CO+H_2$ rises to 130 to 145 grams synthesis products.

When operating with water gas at temperatures of 225° to 235° C. under normal pressure there is obtained, even without prior catalyst reduction, a yield of 135 to 155 grams per cubic meter NTP $CO+H_2$, in which connection 25 to 40% hydrocarbons are obtained which boil over 320° C. The life of the catalyst is at least 4 to 6 months.

At a pressure of 10 atm. above atmospheric pressure there is obtained with water gas even at 200 to 210° C. a carbon monoxide conversion of more than 90% with a yield of 165 to 185 grams per cubic meter NTP $CO+H_2$. The amount of hydrocarbons boiling at a temperature of more than 320° C. increases in this connection to 30–65%.

We claim:

1. In the process for preparing catalysts containing iron and kieselguhr wherein a solution containing dissolved iron nitrate is neutralized with an alkali thereby forming an iron precipitate the improvement which comprises adding the iron nitrate solution to the alkali metal carbonate solution in which the kieselguhr is suspended carrying out the addition of iron nitrate solution to alkali metal carbonate solution in increments starting with an increment not exceeding about 6 per cent of the total iron nitrate solution, increasing the size of increments with each addition so that the total amount of iron nitrate solution will be added in from five to seven additions, permitting carbon dioxide formation to terminate prior to the addition of each increment, then within 20 minutes after neutralization is complete on addition of the last increment of iron nitrate solution heating the resulting catalyst to its boiling point, boiling the paste for a period of from 2 to 7 minutes and drying the catalyst thus formed.

2. In the process for preparing copper and alkali-containing iron catalysts from an iron-copper-alkaline earth-nitrate solution, an alkali and kieselguhr by neutralization of the nitrate solution with alkali thereby forming an iron precipitate, the improvement which comprises adding the nitrate solution to soda solution in which the kieselguhr is suspended, carrying out the addition of iron nitrate solution to soda solution in increments starting with an increment of about 5 per cent of the total nitrate solution, increasing the size of increments with each addition so that the total amount of nitrate solution will be added in from five to seven additions, permitting carbon dioxide formation to cease prior to the addition of each increment, then within 5 to 20 minutes after neutralization is complete on the addition of the last increment of nitrate solution heating the resulting catalyst paste to its boiling point, boiling the paste for a period of from 2 to 7 minutes and drying the catalyst thus formed.

3. The improvement according to claim 2 wherein the concentration of the nitrate solution is not less than 2 per cent.

4. The improvement according to claim 2 wherein the paste is heated to its boiling point within from 8 to 12 minutes.

5. The improvement according to claim 2 wherein the paste is boiled for about 3 to 5 minutes after being heated to its boiling point.

6. The improvement according to claim 2 in which the soda solution contains an excess of 5 to 40 per cent soda above the quantity required to neutralize the nitrate solution.

7. The improvement according to claim 2 in which the nitrate solution contains an excess of 5 to 40 per cent nitric acid.

8. In the process for preparing copper and alkali-containing iron catalysts from kieselguhr, an iron-copper-alkaline earth-nitrate solution and an alkali by neutralization of the nitrate solution with alkali to form an iron precipitate the improvement which comprises employing a nitrate solution of at least 2 per cent nitrate concentration containing an excess of 5 to 40 per cent nitric acid and a soda solution containing an excess of 5 to 40 per cent soda above that required to neutralize the nitrate solution, adding the nitrate solution to soda solution in which kieselguhr is suspended, carrying out the addition of nitrate solution to the soda solution in increments starting with an increment of about 5 per cent of the total nitrate solution, increasing the size of increments with each addition so that the total amount of nitrate solution will be added in from five to seven additions, permitting carbon dioxide formation to cease prior to the addition of each increment, then within 5 to 20 minutes after neutralization is complete on the addition of the last increment of nitrate solution heating the resulting catalyst paste to its boiling point, boiling the paste for a period of from 2 to 7 minutes, drying the catalyst thus formed at a temperature not exceeding 80° C. and recovering the iron catalyst.

9. The improvement according to claim 8 wherein said drying is perfected at a temperature of not less than 60° C.

10. The improvement according to claim 8 wherein the concentration of the nitrate solution is not less than 5 per cent.

References Cited in the file of this patent

UNITED STATES PATENTS

| | | |
|---|---|---|
| 2,257,457 | Fischer et al. | Sept. 30, 1941 |
| 2,617,774 | Rottig | Nov. 11, 1952 |
| 2,628,969 | Rottig | Feb. 17, 1953 |

OTHER REFERENCES

Storch et al.: "The Fischer-Tropsch and Related Synthesis," January 1951, pp. 260–264. Copy in Div. 31.